Dec. 30, 1969     J. R. CURE     3,487,264
MEANS FOR PREVENTING EXCESSIVE CURRENT FLOW BETWEEN
A.C. POWER NETWORKS
Filed May 1, 1967

INVENTOR
JOHN RAYMOND CURE
By: Norris & Bateman Atty

United States Patent Office 3,487,264
Patented Dec. 30, 1969

3,487,264
MEANS FOR PREVENTING EXCESSIVE CURRENT
FLOW BETWEEN A.C. POWER NETWORKS
John Raymond Cure, Marple, England, assignor to Associated Electrical Industries Limited, London, England, a British company
Filed May 1, 1967, Ser. No. 635,253
Claims priority, application Great Britain, May 11, 1966, 20,964/66
Int. Cl. H02h 7/14, 9/00, 1/00
U.S. Cl. 317—14                                    5 Claims

ABSTRACT OF THE DISCLOSURE

For preventing excessive current flow a power transformer and a capacitor located in the vicinity of the transformer are sufficiently series resonant to permit normal current flow between two networks, and are automatically detuned at excessive current flow between the networks, the transformer has two main winding portions connected to the two networks and an additional winding spatially separating the said two winding portions, so that the effective inductive reactance of the transformer contributes to the inductive reactance which is series resonant with the capacitance.

---

This invention relates to the interconnection of alternating current high power networks and aims at providing an improved means for preventing the increase to an undesirable excessive magnitude of the current flow from one network to the other, for instance when a fault such as an earth fault, occurs in one of the networks.

It has already been suggested to provide for limiting such current flow an $L/C$ coupling which is at or near series resonance under normal operating conditions, and is automatically detuned so as to increase its actual impedance whereby to prevent further current flow increase when the magnitude of the current flow attains a predetermined limit value.

The present invention aims at an improvement of such a coupling arrangement which is space-, material-, and cost-saving.

Accordingly this invention resides in an arrangement for preventing excessive current flow between two high power A.C. networks comprising an inductance and capacitance combination which is sufficiently series resonant to permit normal current flow between the two networks, also a means automatically disturbing the resonance at excessive current flow between the networks, a power transformer and a capacitor located in the vicinity of the transformer, the transformer having two main winding portions connected to the two networks, and having an additional winding spatially separating the said two winding portions, the effective inductive reactance of the transformer contributing to the inductive reactance which is series resonant with the capacitance.

The transformer can be double-wound or of the auto-transformer kind, and the additional winding can comprise a regulating winding or a correcting winding, or both.

More details will become apparent and the invention will be better understood from the following description referring to the accompanying drawings in which.

Figure 1:
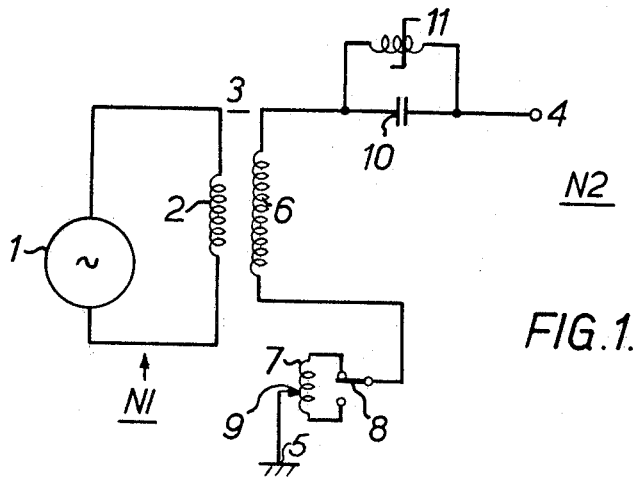
FIGS. 1 and 2 show diagrammatically and by way of example network coupling means according to the invention and including respectively a double wound transformer and an auto-transformer.

Referring to FIG. 1 of the networks N1 comprises an A.C. generator 1 feeding a primary winding 2 of a power transformer 3. The other network N2 has one end connected to a terminal 4 and has the other end earthed at a point 5. The network coupling means include a secondary winding 6 of the transformer 2. In the present case it is assumed that the winding 6 supplies a voltage which is higher than that of the winding 2. The transformer 3 also includes a regulating winding 7 one and the other end of which can be connected alternatively to the lower end of the secondary winding 6 by means of a switch-over contact 8, for boosting or bucking the output voltage of the winding 6. A contact 9 connected to the earthing point 5 is movable along tapping points of the winding 7 for fine regulation. This voltage regulation known per se, is for on-load switching facilitated by the excess current limiting arrangement of the present invention. Connected in series with the winding 6 is a parallel circuit comprising a capacitor 10 and a reactor 11 which is designed to saturate at predetermined capacitor current and voltage, to cause through bypassing the capacitor automatic excess current limitation by disturbing the resonance or near resonance between the transformer and capacitor reactances which prevails at normal network operation.

Figure 3:
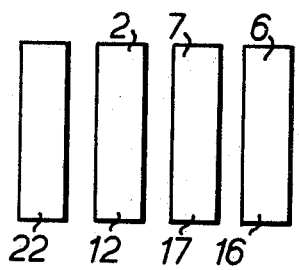
FIGS. 3 and 4 show very diagrammatically the positional relationship of the various windings of the said transformers.

The positional relationship of the primary winding 2, secondary winding 6 and regulating winding 7 is as indicated in FIG. 3, with the regulating winding between the other two windings, to ensure a desirable high inductive reactance. In many cases it will be possible to provide in this manner for the total inductive reactance necessary for series resonance. However, where individual network conditions necessitate a higher inductive reactance, a choke (not shown) can be employed to aid the inductive reactance of the transformer.

Figure 2:
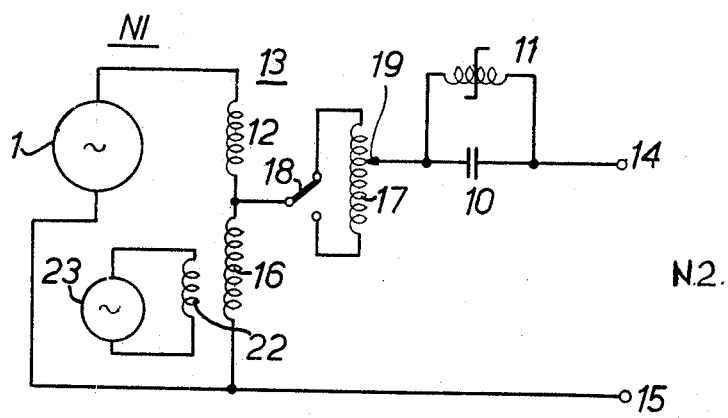

Referring to FIG. 2 it will be seen that an auto-transformer 13 has the outer ends of series connected winding portions 12, 16 connected to one of the networks which includes here a generator 1. The other network N2 has one end connected to a terminal 14 and the other end connected to a terminal 15 which is connected to one of the two output terminals of the generator 1.

The transformer 13 has a regulating additional winding 17 which is connectible through a changeover contact 18 to a point between the windings 12, 16. The winding 16 of the auto-transformer is thus connected to both networks N1, N2, while the winding 12 is connected only to the primary circuit that is the network N1. A parallel circuit, comprising a capacitor 10 and a saturable reactor 11, is connected between a movable contact 19 co-operating with tapping points of the regulating winding 17 and the terminal 14. An auxiliary correcting winding 22 of the transformer 13 is supplied from a synchronous dynamo-electric machine 23 and serves here to correct the power-factor. Other compensations such as for variations in the reactive power as caused by temperature drift in the condenser for instance can also be achieved by an auxiliary correcting winding.

Figure 4:
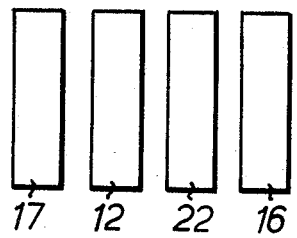

The regulating winding 17 is positionally interposed between the windings 12, 16 in order to increase the total transformer reactance, as indicated in FIG. 3. Alternatively the auxiliary winding 22 can be arranged between the common winding portion 16 and the series winding portion 12 as shown by FIG. 4, with the regulating winding 17 positioned at the other side of the winding 12. FIG. 3 shows that an auxiliary winding 22 need not be interposed between main windings where a regulating winding spatially separates them, but both a regulating winding and an auxiliary, tertiary or correcting winding can spatially separate the main windings for increased inductive reactance effect, as required for the $L/C$ coupling operation. On-load voltage regulation is also facilitated as with an arrangement according to FIG. 2.

While preferred embodiments of the invention have been shown and described it will be understood that variations are possible without departing from the invention as defined by the appended claims. The $L/C$ coupling that is the circuit which is virtually series-resonant at normal network operation may comprise other components including a means for damping out oscillations when normal operation is restored after a fault is cleared in one of the networks.

I claim:

1. An arrangement for preventing excessive flow between two high power A.C. networks comprising an inductance and capacitance combination which is sufficiently series resonant to permit normal current flow between the two networks, also a means automatically disturbing the resonance at excessive current flow between the networks, characterised by a power transformer and a capacitor located in the vicinity of the transformer, the transformer having two main winding portions connected to the two networks, and having an additional winding spatially separating the said two winding portions, the effective inductive reactance of the transformer contributing to the inductive reactance which is series resonant with the capacitance.

2. An arrangement according to claim 1 characterised in that the additional winding comprises a voltage regulating winding.

3. An arrangement according to claim 1 characterised in that the additional winding comprises a correcting winding.

4. An arrangement according to claim 1 characterised in that the transformer is of a double-wound type.

5. An arrangement according to claim 1 characterised in that the transformer is of an auto-transformer type.

References Cited

UNITED STATES PATENTS

| | | | |
|---|---|---|---|
| 1,717,317 | 6/1929 | Horsley et al. | 323—76 |
| 1,830,938 | 11/1931 | Gay | 323—76 |
| 3,296,492 | 1/1967 | Drozdov et al. | 317—14 |

LEE T. HIX, Primary Examiner

J. D. TRAMMELL, Assistant Examiner

U.S. Cl. X.R.

317—20, 53; 323—9, 56, 76, 89